US005532747A

United States Patent [19]

Yoon et al.

[11] Patent Number: 5,532,747
[45] Date of Patent: Jul. 2, 1996

[54] METHOD FOR EFFECTUATING HALF-PIXEL MOTION COMPENSATION IN DECODING AN IMAGE SIGNAL

[75] Inventors: Sang-Ho Yoon; Oh-Sang Kwon, both of Seoul, Rep. of Korea

[73] Assignee: Daewoo Electronics Co., Ltd., Seoul, Rep. of Korea

[21] Appl. No.: 308,237

[22] Filed: Sep. 19, 1994

[30] Foreign Application Priority Data

Sep. 17, 1993 [KR] Rep. of Korea .................. 93-18874

[51] Int. Cl.⁶ ..................................................... H04N 7/50
[52] U.S. Cl. ............................................. 348/416; 348/699
[58] Field of Search ..................................... 348/384, 390, 348/402, 409, 412, 413, 415, 416, 699; H04N 7/133, 7/137

[56] References Cited

U.S. PATENT DOCUMENTS

| | | | |
|---|---|---|---|
| 4,937,666 | 6/1990 | Yang | 348/413 |
| 5,099,325 | 3/1992 | Artieri et al. | 348/412 |
| 5,134,477 | 7/1992 | Knauer et al. | 348/416 |
| 5,355,168 | 10/1994 | Sugiyama | 348/416 |
| 5,398,079 | 3/1995 | Liu et al. | 348/699 |
| 5,408,269 | 4/1995 | Tsukagoshi | 348/416 |
| 5,461,423 | 10/1995 | Tsukagoshi | 348/699 |

FOREIGN PATENT DOCUMENTS

| | | |
|---|---|---|
| 0369854 | 5/1990 | European Pat. Off. . |
| 0497586 | 8/1992 | European Pat. Off. . |
| 0557948 | 9/1993 | European Pat. Off. . |
| 0613304 | 8/1994 | European Pat. Off. . |
| 05227527 | 9/1993 | Japan . |

OTHER PUBLICATIONS

Uramoto et al, "A Half-Pel Precision Motion Estimation Processor of NTSC-Resolution Video", Proceedings of the IEEE 1993 Custom Integrated Circuits Conference, May 1993.

Primary Examiner—Tommy P. Chin
Assistant Examiner—Richard Lee
Attorney, Agent, or Firm—Anderson Kill Olick & Oshinsky

[57] ABSTRACT

A method for decoding an encoded image signal supplied in the form of a series of encoded image frames, each of the encoded image frames being divided into a multiplicity of macroblocks of pixels, each of the macroblocks having an associated half-pixel resolution motion vector which represents a translatory motion of the macroblock between a present and its preceding frames of the encoded image signal to a half-pixel accuracy, comprises: providing differential pixels of a differential macroblock in a first predetermined scanning order by performing entropy decoding, inverse quantization and inverse transformation on the pixels in each macroblock of the present frame; scanning the differential pixels so as to provide scan converted differential pixels of a scan converted differential macroblock in a second predetermined scanning order; providing half-pixel resolution pixels of a half-pixel resolution macroblock in the second predetermined scanning order by accessing, under a control of the half-pixel resolution motion vector, the pixels in the previous frame in an order corresponding to the second predetermined scanning order and, depending on the half-pixel resolution motion vector, performing a spatial interpolation on the pixels in the previous frame; and adding, on a pixel-by-pixel basis, the scan converted differential macroblock to the half-pixel resolution macroblock, to thereby form a reconstructed macroblock of the present frame.

2 Claims, 9 Drawing Sheets

FIG.3B
(PRIOR ART)

□ : PIXELS FROM THE PREVIOUS FRAME

● : PIXELS OF A HALF-PIXEL RESOLUTION SUBBLOCK

FIG. 8

■ : PIXELS IN A DIFFERENTIAL MACROBLOCK

☐ :

METHOD FOR EFFECTUATING HALF-PIXEL MOTION COMPENSATION IN DECODING AN IMAGE SIGNAL

FIELD OF THE INVENTION

The present invention relates to a decoding process of an encoded image signal; and, more particularly, to a method for carrying out half-pixel motion compensation in the decoding process of encoded image signals.

DISCRIPTION OF THE PRIOR ART

As is well known in the art, transmission of digitized image signals can attain images of a much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data therethrough, it is inevitable to compress or reduce the volume of the transmission data. Among various image signal compression techniques, the so-called hybrid coding technique, which combines temporal and spatial compression techniques, together with a statistical coding technique, is known to be most effective.

FIG. 1 illustrates a hybrid coder employing the hybrid coding technique. As shown in FIG. 1, each block of pixels from a digitized input frame is fed to a subtracter 101. In the subtracter 101, each block of pixels, each of which represents the magnitude of a picture element, is differentially combined, on an element-by-element basis, with a predicted block of pixels from the previous frame. The block of resultant difference data is transformed to a block of transform coefficients using a two-dimensional transform algorithm at a two-dimensional transformer 102, and the coefficients in each block of transform coefficients are quantized at a quantizer 103 and entropy coded at an entropy coder 104 for their transmission through a transmission channel. At the encoder 100, each block, and thereby the entire frame, is reconstructed by inversely quantizing and transforming the quantized coefficients and adding them to the pixels of the corresponding predicted block at a summer 107. A frame memory 108 stores the reconstructed pixels for the next block-by-block prediction of the pixels in a next image frame. Similarly, at a decoder 200, shown in FIG. 2, corresponding to the encoder 100, an entropy decoder 202 decodes the entropy coded data stream and an inverse quantizer 203 and an inverse transformer 204 restore the differential pixels for each block which are added at a summer 205 to the pixels of the corresponding predicted block. A frame memory 207 stores the resultant reconstructed pixels.

The coding efficiency of the hybrid coder 100 can be improved by using a motion compensation or motion compensated prediction method. Motion compensated prediction is a process of predicting each block of pixels in a present frame from the pixels in its previous frame based on an estimation of a translatory motion of the block between the present and the previous frames. Such estimated motion can be described by a motion vector which consists of a horizontal and a vertical components indicating the horizontal and the vertical offsets of the predicted block's location in the previous frame, respectively, with reference to the present block's location.

In some of the currently available schemes such as ISO/IEC MPEG standards, for further enhancement of the coding efficiency, the motion vector may be detected to a half-pixel accuracy(see MPEG Video Simulation Model Three, International Organization for Standardization, Coded Representation of Picture and Audio Information, 1990, ISO-IEC/JTC1/SC2/WG8 MPEG 90/041). The half-pixel resolution motion vector is determined in three steps. First, an integer-valued full-pixel resolution motion vector is estimated. Then, half-pixel,resolution motion vectors are derived based on the full-pixel resolution motion vector. Among the full-pixel and half-pixel resolution motion vectors, the one that can give the best prediction performance is chosen as the final half-pixel resolution motion vector. The half-pixel resolution motion vector may have non-integer horizontal/vertical components and point to a location between full-pixel locations. In such schemes, a half-pixel resolution block to be used for motion compensated prediction is obtained by, under a control of the half-pixel resolution motion vector, accessing pixels of the previous frame and, if the half-pixel resolution motion vector has a non-integer component(s), performing spatial interpolation on the pixels of the previous frame( U.S. Pat. No. 5,134,477 issued on Jul. 28, 1992 to Knauer et al.; and EP Publication. No. 0560577A2).

The half-pixel resolution motion vectors, together with the entropy coded data, are forwarded via the transmission channel to the associated decoder 200 for use in the conducting motion compensated prediction therein.

In the decoder 200 shown in FIG. 2, motion compensated prediction is typically performed on a macroblock basis wherein each, e.g., 16×8 pixels, macroblock is further divided into subblocks of, e.g., 4 ×4 pixels, since the encoder 100 often cannot encode a full set of half-pixel resolution motion vectors for the 4×4 subblocks in the bit budget allocated in the transmission channel for the half-pixel resolution motion vectors; and, therefore, associates a half-pixel resolution motion vector with the entire 16×8 macroblock containing the 4 ×4 subblocks.

When motion compensated prediction is performed on a macroblock basis at the decoder 200 of FIG. 2, the subblocks of pixels within each differential macroblock from the inverse transformer 204 are normally provided to the summer 205 in a "row-wise inter-subblock scanning" order: that is, the differential subblocks are scanned horizontally from left to right and top to bottom; and, within each differential subblock, the pixels are provided to the summer 205 in a "row-wise intra-subblock scanning" order: the pixels are scanned horizontally from left to right and top to bottom, as shown in FIGS. 3A and 3B, respectively. Further, the subblocks, and the pixels thereof, within each half-pixel resolution macroblock from the motion compensated predictor 206 are provided to the summer 205 in the row-wise inter-subblock and the row-wise intra-subblock scanning orders, respectively. As stated previously, the half-resolution macroblock is predicted by, under the control of the half-pixel resolution motion vector associated with the differential macroblock, accessing pixels of the previous frame from the frame memory 207 and, if the half-pixel resolution motion vector has a non-integer component(s), performing spatial interpolation on the pixels of the previous frame.

Since, when a half-pixel resolution motion vector has a non-integer value(e.g., +0.5) as its horizontal component, 5×4 pixels (or 5×5 pixels, in case the half-pixel resolution motion vector has a non-integer vertical component as well) need be interpolated to produce a half-pixel resolution subblock of 4×4 pixels, a subblock of 4×4 pixels and an additional column of 4 pixels horizontally adjacent thereto should be accessed from the previous frame, (to produce each subblock of a half-pixel resolution macroblock,) as illustrated in FIG. 4.

As the subblock and the additional column of pixels are accessed from the previous frame in an order corresponding to the row-wise intra-subblock scanning order so as to produce the pixels of each half-pixel resolution subblock in the row-wise intra-subblock scanning order, the additional column of pixels may be accessed from the previous frame twice: once for the production of the half-pixel resolution subblock and another time for the production of a next horizontally adjacent half-pixel resolution subblock, as illustrated in FIG. 5, which may incur a substantial processing overhead.

However, if, in the above case, the subblock and the additional column of pixels can be accessed from the previous frame in a different order, that is, if the pixels are scanned vertically from top to bottom and left to right as shown in FIG. 6, the additional column of pixels may need be accessed once as the additional column of pixels is readily available for the spatial interpolation for the production of the next horizontally adjacent half-pixel resolution subblock, as illustrated in FIG. 6.

SUMMARY OF THE INVINTION

It is therefore a primary object of the invention to provide a method for performing half-pixel motion compensated prediction in the decoding of an encoded image signal, wherein the number of the previous frame accesses can be reduced.

In accordance with the present invention, there is provided a method for decoding an encoded image signal supplied in the form of a series of encoded image frames, each of the encoded image frames being divided into a multiplicity of macroblocks of pixels, each of the macroblocks having an associated half-pixel resolution motion vector which represents a translatory motion of the macroblock between a present and its preceding frames of the encoded image signal to a half-pixel accuracy, said method comprising the steps of:

providing differential pixels of a differential macroblock in a first predetermined scanning order by performing entropy decoding, inverse quantization and inverse transformation on the pixels in each macroblock of the present frame;

scanning the differential pixels so as to provide scan converted differential pixels of a scan converted differential macroblock in a second predetermined scanning order;

providing half-pixel resolution pixels of a half-pixel resolution macroblock in the second predetermined scanning order by accessing, under a control of the half-pixel resolution motion vector, the pixels in the previous frame in an order corresponding to the second predetermined scanning order and, depending on the half-pixel resolution motion vector, performing a spatial interpolation on the pixels in the previous frame; and adding, on a pixel-by-pixel basis, the scan converted differential macroblock to the half-pixel resolution macroblock, to thereby form a reconstructed macroblock of the present frame.

BRIEF DESCRIPTION OF THE DRAWING

The above and other objects and features of the instant invention will become apparent from the following description of preferred embodiments given in conjunction with the accompanying drawings, in which:

Figure 3B:
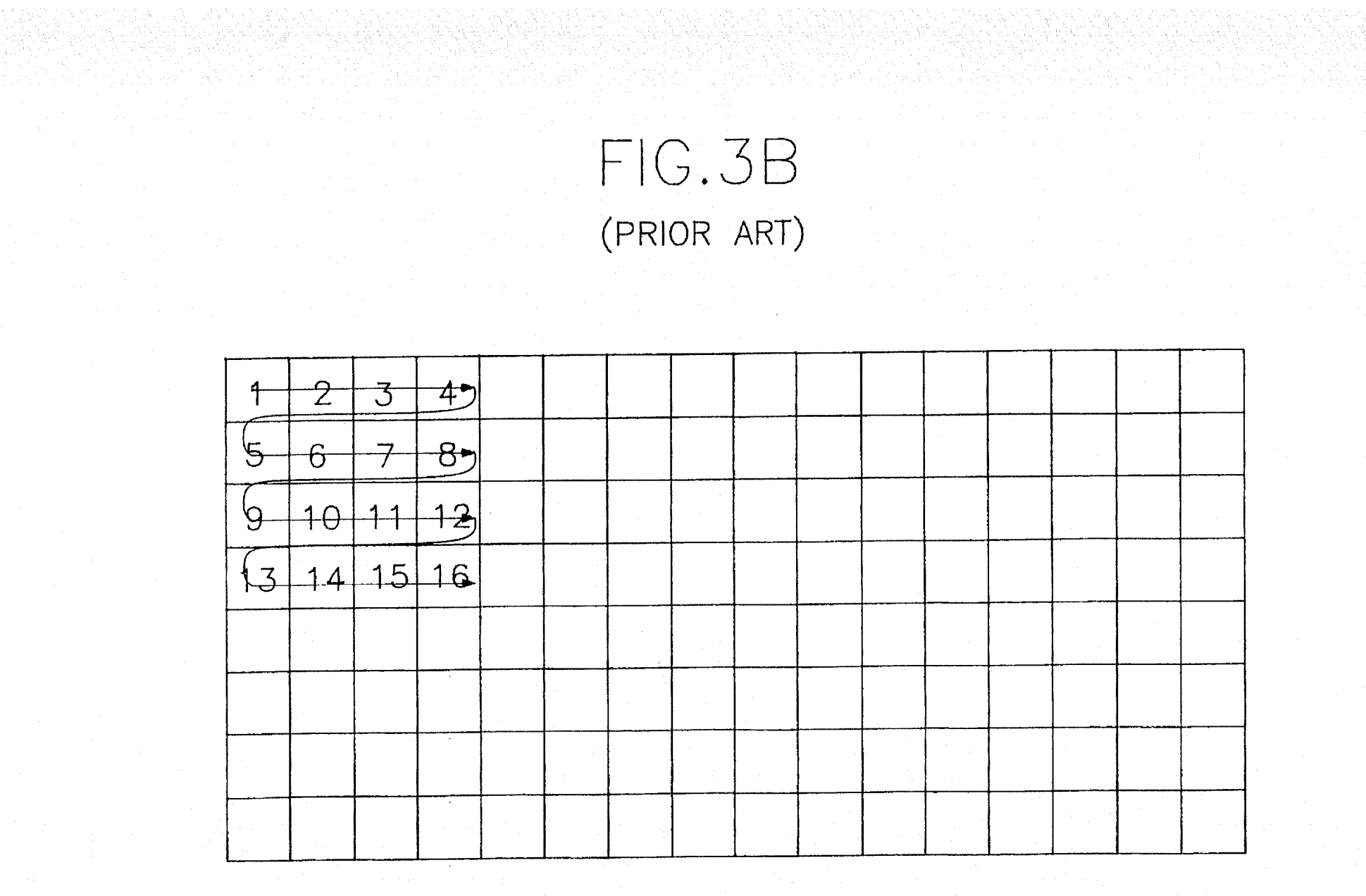

FIGS. 3A and 3b depict row-wise inter and intra-subblock scanning patterns, respectively;

FIG. 8 offers a column-wise intra-subblock scanning pattern.

DESCRIPTION OF THE PREFERRED EMBODIMENTS

Figure 1:
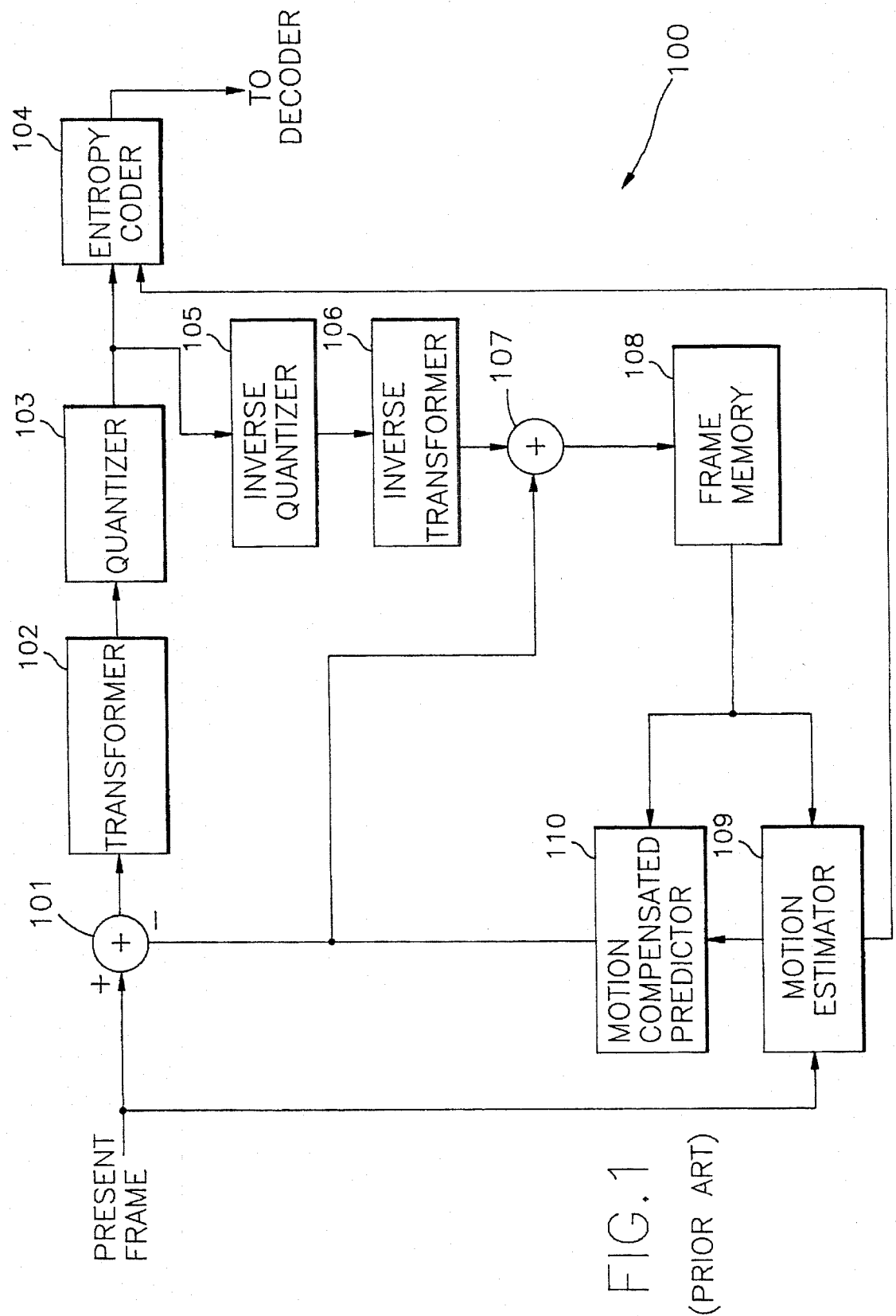
FIG. 1 is a block diagram of a prior art hybrid coder.
Figure 2:
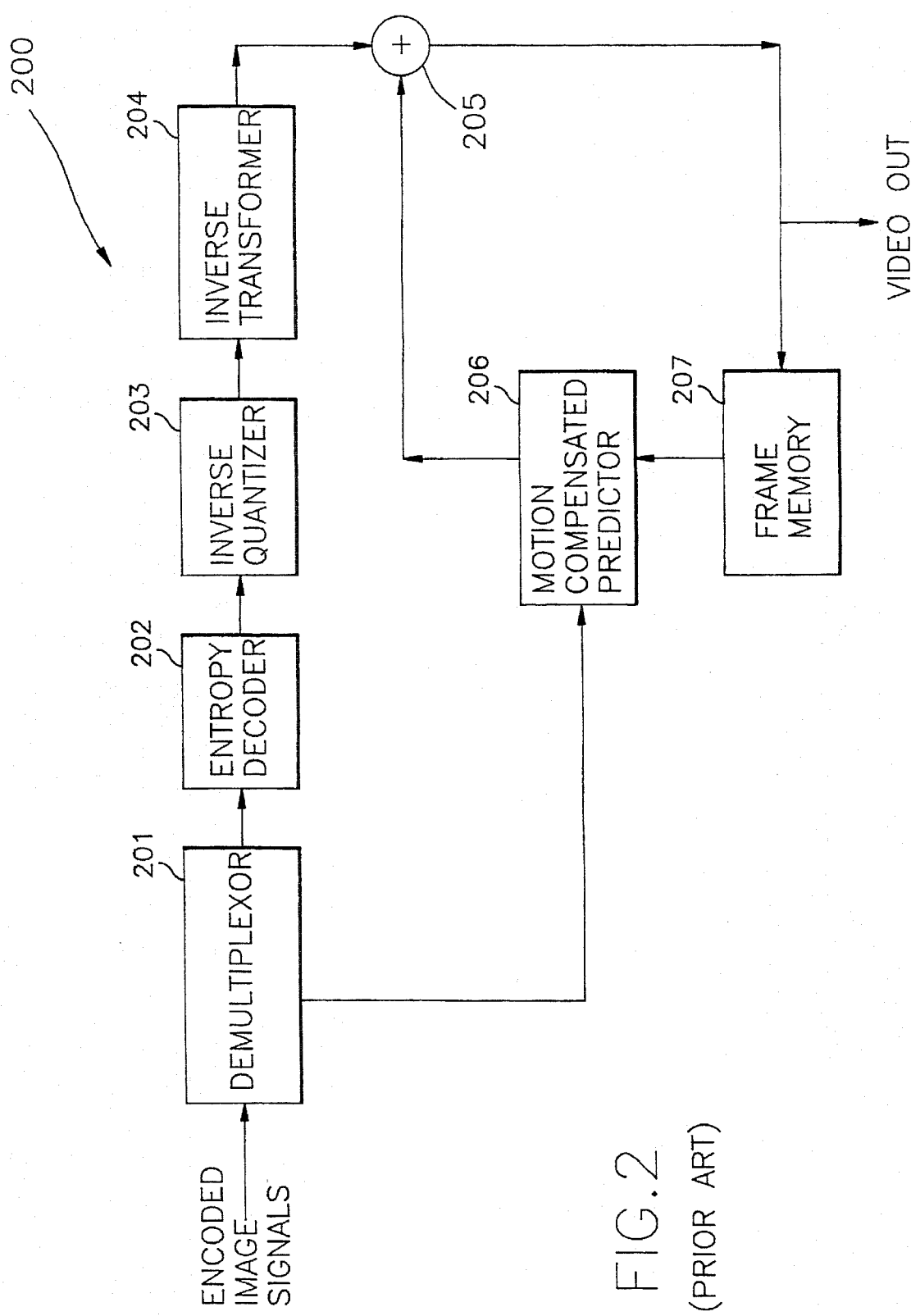
FIG. 2 shows a block diagram of a prior art decoder matching with the encoder of FIG. 1.
Figure 3A:
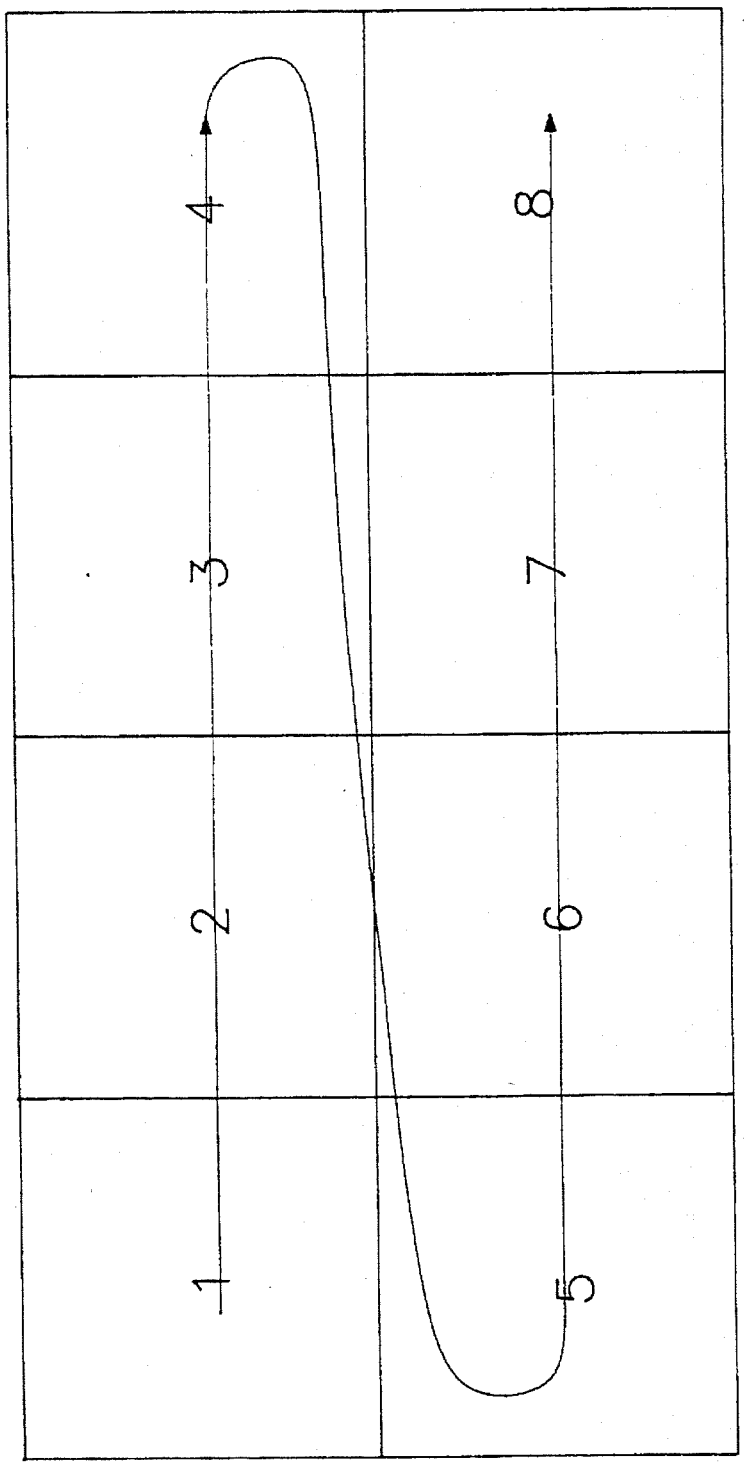
Figure 4:
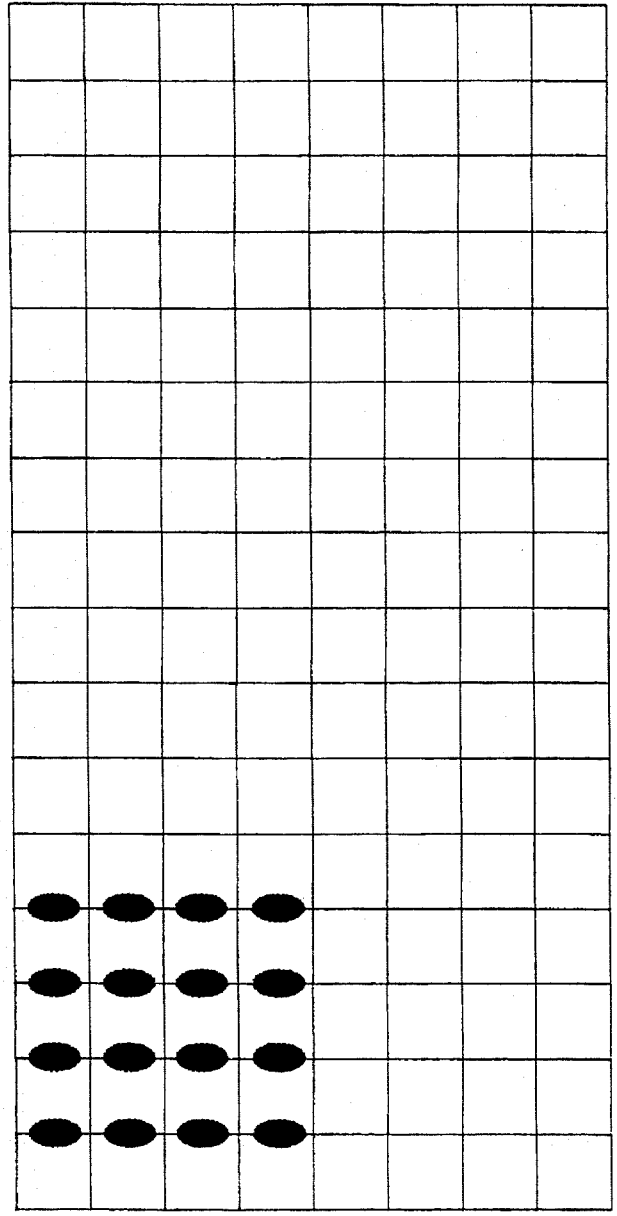
FIG. 4 illustrates a number of pixels from the previous frame, necessary for forming a half-pixel resolution subblock of 8×8 pixels.
Figure 5:
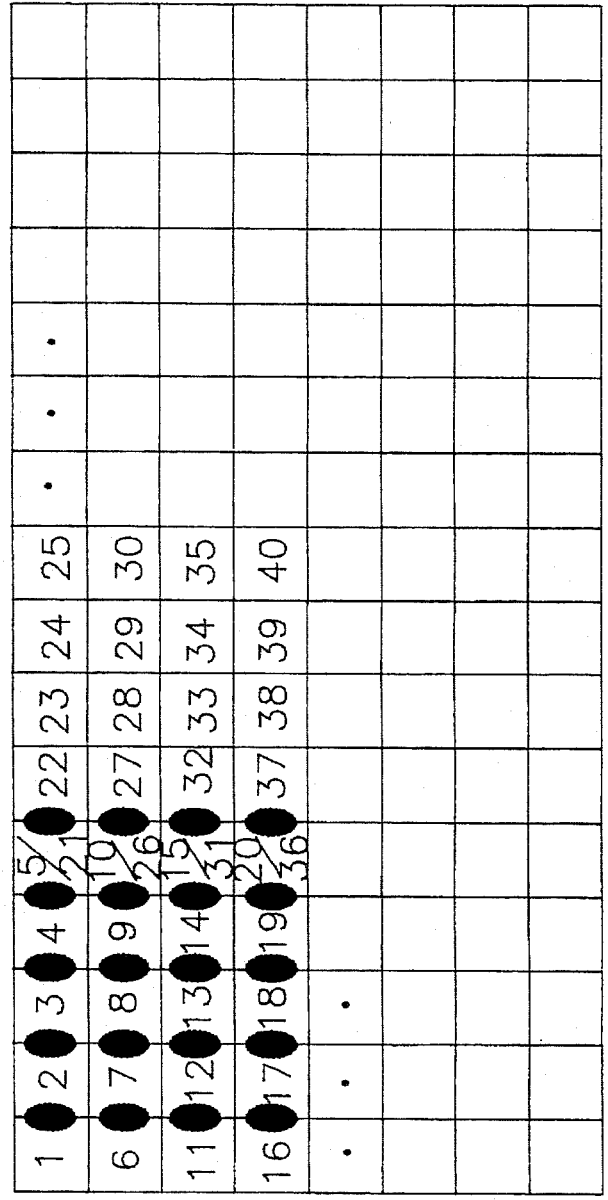
FIG. 5 represents a conventional access pattern for pixels from the previous frame.
Figure 7:
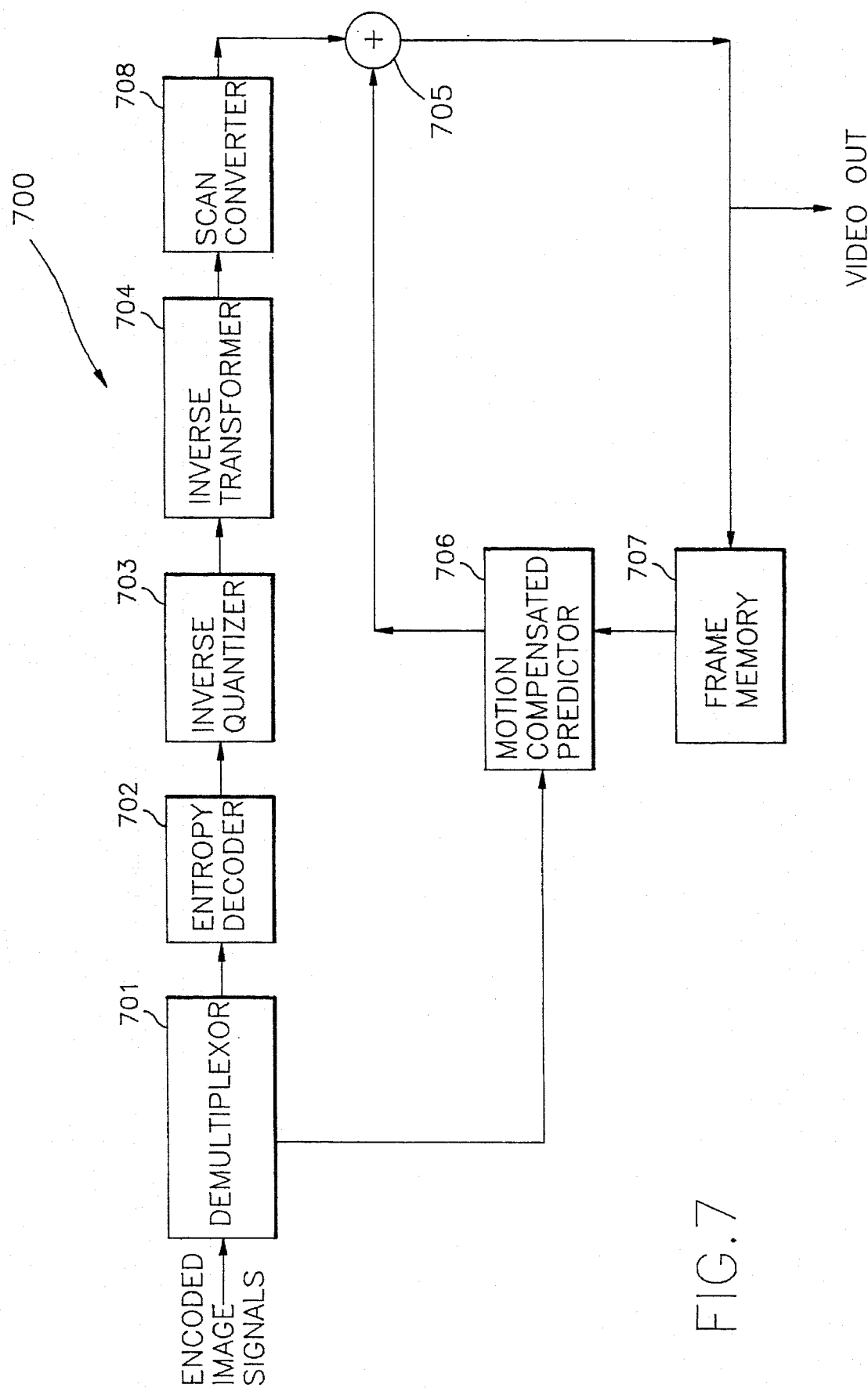
FIG. 7 set forth a block diagram of a decoder matching with the encoder of FIG. 1, wherein the inventive method can be implemented.

Referring to FIG. 7, there is shown an exemplary decoder 700 matching with the hybrid coder 100 of FIG. 1, wherein the method of the present invention can be implemented.

Encoded image signals from the hybrid coder 100 are supplied to the decoder 700 in the form of a series of encoded image frames, each of which is divided into a multiplicity of macroblocks of a first identical size, e.g., 16×8 of pixels. Each of the macroblocks has an associated half-pixel resolution motion vector and is further divided into a plurality of subblocks of a second identical size, e.g., 4×4 pixels. Further, in the decoder 700, motion compensated prediction is performed on a macroblock basis.

As shown in FIG. 7, a demultiplexor 701 takes the encoded image signals, identifies its constituents(e.g., half-pixel resolution motion vectors, entropy coded data, etc.) and routes them to the relevant parts of the decoder 700. The entryopy coded data is decoded at an entropy decoder 702, and inversely quantized and transformed by an inverse quantizer 703 and an inverse transformer 704. Each macroblock of the resultant differential pixels from the inverse transformer 704 is then summed at the summer 705 with the half-pixel resolution macroblock provided by a motion compensated predictor 706 under control of the half-pixel resolution motion vector associated with the differential macroblock, to thereby form the reconstructed macroblock of the present frame to be stored in a frame memory 706.

The subblocks of pixels within each differential macroblock from the inverse transformer 704 are provided to the summer 705 in the above described row-wise inter-subblock scanning order: the differential subblocks are scanned horizontally from left to right and top to bottom. Further, the subblocks within each half-pixel resolution macroblock from the motion compensated predictor 706 are provided to the summer 705 in the row-wise inter-subblock scanning order, as is conventional.

In accordance with the method of the present invention, however, the pixels within each differential or half-pixel resolution subblock are provided to the summer in an order different from the conventional row-wise intra-subblock scanning order.

Figure 8:
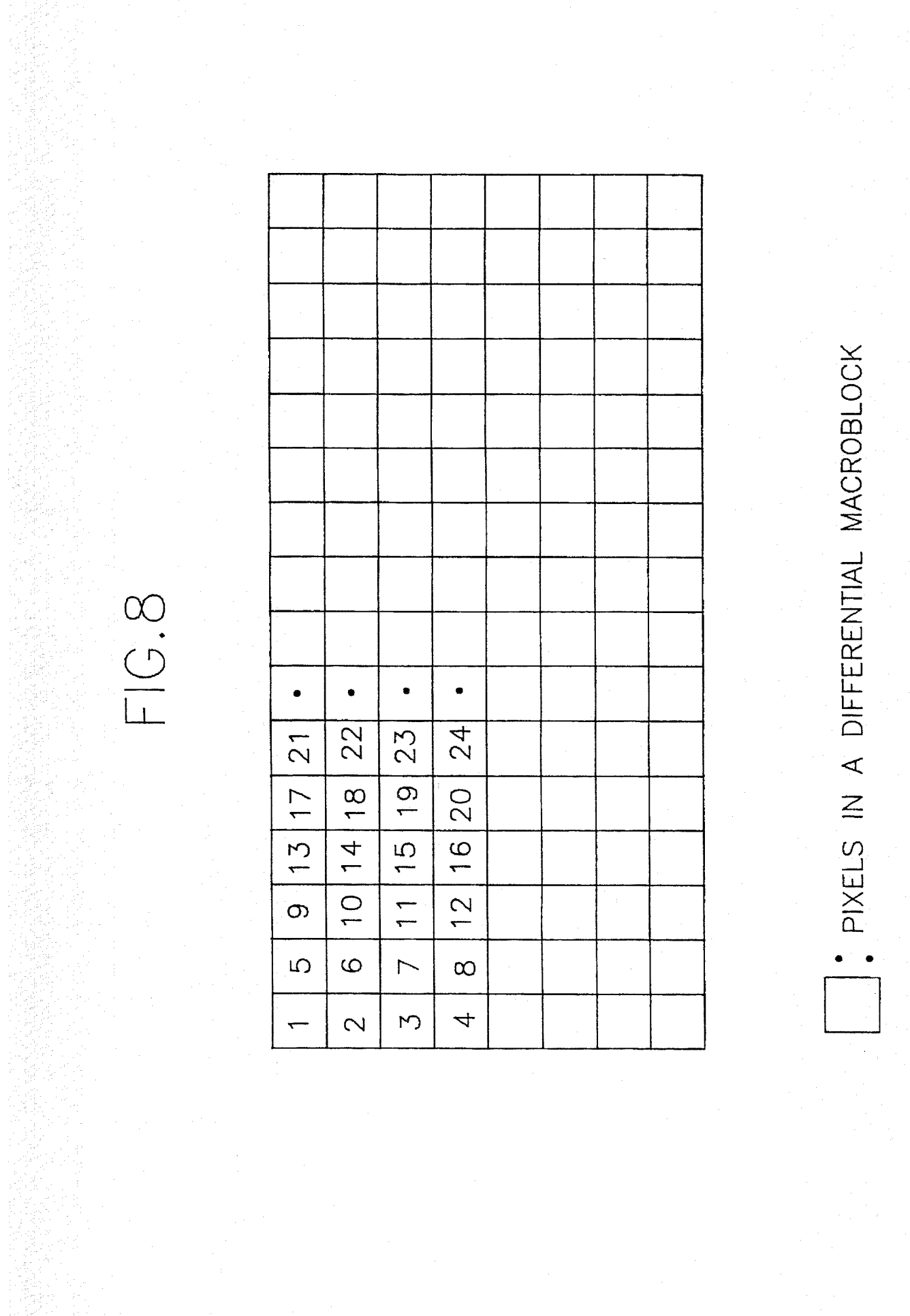

Specifically, the pixels within each differential subblock are, via a scan converter 708 of the present invention, provided to the summer 705 in a "column-wise intra-subblock scanning" order: the pixels are scanned vertically from top to bottom and left to right, as illustrated in FIG. 8.

Figure 6:
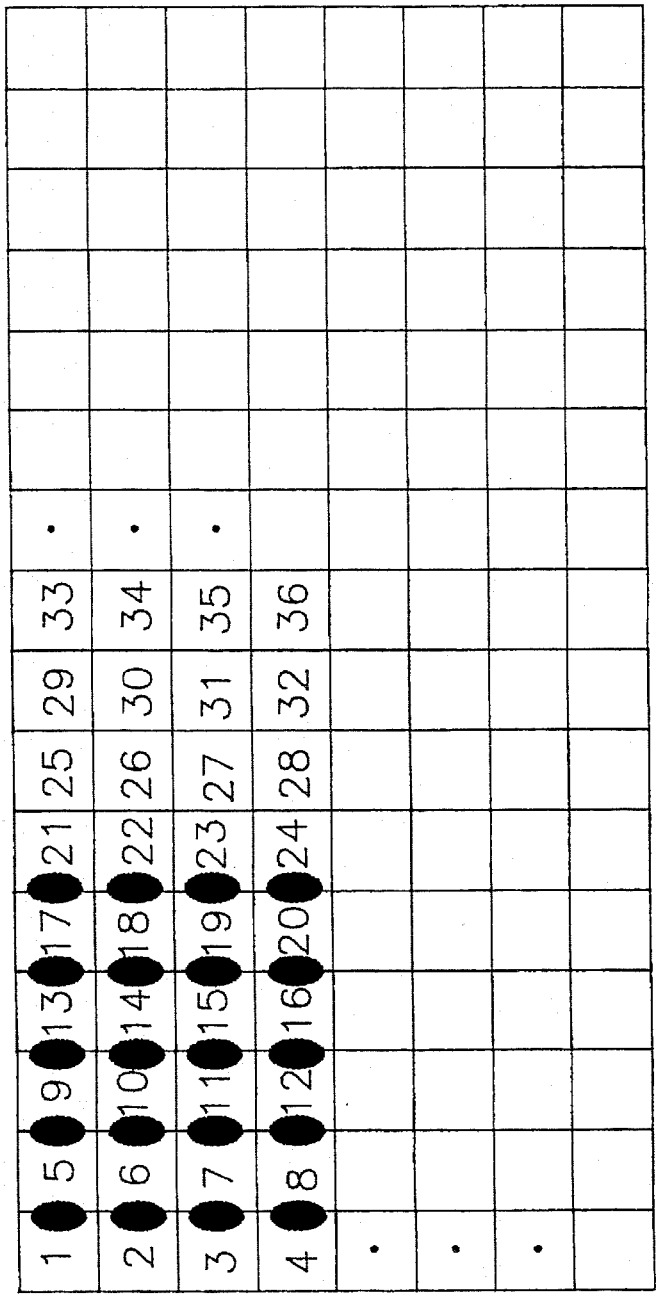
FIG. 6 presents a different access pattern for pixels from the previous frame.

Simultaneously, at the motion compensated predictor 706, when the half-pixel resolution motion vector has a non-integer horizontal component, a subblock of 4×4 pixels and an additional column of 4 pixels, which is required for producing each half-pixel resolution subblock by performing spatial interpolation thereon, within the previous frame are accessed from the frame memory 707 in an order corresponding to the column-wise intra-subblock scanning order as illustrated in FIG. 6, so as to provide to the summer 705 the pixels of each half-pixel resolution subblock in the column-wise intra-subblock scanning order.

As previously discussed with reference to FIG. 6, with the above-described half-pixel motion compensated prediction method of the present invention, the number of frame memory accesses required for producing half-pixel resolution subblocks and therefore half-pixel resolution macroblocks is reduced.

While the present invention has been described with respect to the particular embodiments, it will be apparent to those skilled in the art that various changes and modifications may be made without departing from the scope of the present invention as defined in the following claims.

What is claimed is:

1. A method for decoding an encoded image signal supplied in the form of a series of encoded image frames, each of the encoded image frames being divided into a multiplicity of macroblocks of pixels, each of the macroblocks having an associated half-pixel resolution motion vector which represents a translatory motion of the macroblock between a present and its preceding frames of the encoded image signal to a half-pixel accuracy, said method comprising the steps of:

providing differential pixels of a differential macroblock in a first predetermined scanning order by performing entropy decoding, inverse quantization and inverse transformation on the pixels in each macroblock of the present frame;

scanning the differential pixels so as to provide scan converted differential pixels of a scan converted differential macroblock in a second predetermined scanning order;

providing half-pixel resolution pixels of a half-pixel resolution macroblock in the second predetermined scanning order by accessing, under a control of the half-pixel resolution motion vector, the pixels in the previous frame in an order corresponding to the second predetermined scanning order and, depending on the half-pixel resolution motion vector, performing a spatial interpolation on the pixels in the previous frame; and adding, on a pixel-by-pixel basis, the scan converted differential macroblock to the half-pixel resolution macroblock, to thereby form a reconstructed macroblock of the present frame.

2. The method of claim 1, wherein each of the macroblocks is further divided into a plurality of subblocks, and said first predetermined scanning order uses a row-wise inter-subblock and a row-wise intra-subblock scanning methods, and said second predetermined scanning order uses a row-wise inter-subblock and a column-wise intra-subblock scanning methods.

* * * * *